US005757790A

United States Patent [19]
Taketsugu

[11] Patent Number: 5,757,790
[45] Date of Patent: May 26, 1998

[54] PACKET COMMUNICATION SYSTEM CAPABLE OF RAPIDLY CONFIRMING RECEIPT OF DOWNWARD PACKET SIGNALS

[75] Inventor: Masanori Taketsugu, Tokyo, Japan

[73] Assignee: NEC Corporation, Tokyo, Japan

[21] Appl. No.: 609,685

[22] Filed: Mar. 1, 1996

[30] Foreign Application Priority Data

Mar. 2, 1995 [JP] Japan .................................. 7-042881

[51] Int. Cl.$^6$ .................................................. H04B 7/216
[52] U.S. Cl. .......................... 370/342; 370/432; 370/445
[58] Field of Search ................................ 370/342, 343, 370/345, 349, 432, 436, 442, 443, 444, 445, 278, 280, 281, 286, 287, 294, 295

[56] References Cited

U.S. PATENT DOCUMENTS

| 4,646,082 | 2/1987 | Engel et al. ................... 370/342 |
| 5,227,775 | 7/1993 | Bruckert et al. ................ 370/342 |

FOREIGN PATENT DOCUMENTS

| 0 263 421 | 4/1988 | European Pat. Off. . |
| 0 594 458 | 4/1994 | European Pat. Off. . |
| WO 89/11126 | 11/1989 | WIPO . |
| WO 94/24786 | 10/1994 | WIPO . |

OTHER PUBLICATIONS by Schwartz, M., Telecommunication Networks Protocols, Modeling and Analysis, pp. 403–423 and 432–441.
by Onoe, S. et al., "Control Channel Structure for TDMA Mobile Radio Systems" IEEE, pp. 270–275.
By Murase, A. et al., "Idle–Signal Casting Multiple Access with Collision Detection (ICMA–CD) for Land Mobile Radio", IEEE Transactions on Vehicular Technology, vol. VT–36, No. 2, May 1987, pp. 45–51.

Primary Examiner—Chi H. Pham
Assistant Examiner—Steven Nguyen
Attorney, Agent, or Firm—Young & Thompson

[57] ABSTRACT

A packet communication system is capable of rapidly carrying out receipt confirmation for transmission of a downward packet signal. When a radio base station (100) wishes to obtain from a terminal (101) response information indicating that the terminal has received a downward packet signal, the radio base station temporarily inhibits a terminal (102) from transmitting an upward packet signal so as to enable the terminal to transmit as an upward packet signal a packet signal containing the response information.

10 Claims, 6 Drawing Sheets

PACKET COMMUNICATION SYSTEM CAPABLE OF RAPIDLY CONFIRMING RECEIPT OF DOWNWARD PACKET SIGNALS

BACKGROUND OF THE INVENTION

This invention relates to a packet communication system for carrying out packet communication between a base station and a plurality of terminals through a common communication medium, and to a base station included in the packet communication system. In the packet communication system, the common communication medium comprises a downward communication channel for downward transmission from the base station to the terminals and an upward transmission channel for upward transmission from the terminals to the base station.

In packet communication among a plurality of transmitting and receiving stations, namely, a plurality of terminals, packet signals are produced in a burst fashion. In order to efficiently transmit those packet signals, use has generally been made of a packet communication system in which a single common communication medium is shared among the terminals. Specifically, the common communication medium is a point-to-multipoint transmission line between a single base station and the terminals. Hereafter, a packet signal transmitted from the base station to the terminals will be called a downward packet signal while a packet signal transmitted from the terminals to the base station will be called an upward packet signal. The downward packet signal is transmitted in a broadcasting mode and can be received by all of the terminals. On the other hand, upward transmission is carried out in a multiple access mode in which the terminals use a common base station. Achievement of an efficient multiple access system in the upward transmission enables an enlargement of a transmission capacity per one communication medium as well as a substantial increase of a subscriber capacity of the system.

Proposals have been made of various multiple access systems. As one of the proposals, an ALOHA system is known and is simplest in control. The details are described in Telecommunication Networks (ISBN 0-201-16423), pp. 407-408. The basic concept of this system is to make a terminal transmit a new packet signal immediately after it is produced. Accordingly, a very small delay is achieved although collision possibly occurs.

Another one of the proposals, a CSMA (Carrier Sense Multiple Access) system is described in Telecommunication Networks (ISBN 0-201-16423), p. 437. In the CSMA system, a receiving section detects whether or not other terminals are currently involved in transmission. Immediately after detection of an idle period, a packet signal is allowed to be transmitted. The CSMA system can reduce collision between packet signals being transmitted, as compared with the ALOHA system.

However, carrier sensing is impossible in case where the terminals are seldom present within sight of one another and an influence of so-called hidden terminals is great, for example, in case of mobile communication. In view of the above, use is made of an ICMA (Idle-signal Casting Multiple Access) system in which a radio base station transmits an idle signal to thereby reduce collision between packet signals during a multiple access operation so as to improve an efficiency.

Still another one of proposals is made of an ICMA-PE (Idle-signal Casting Multiple Access with Partial Echo) system. The ICMA-PE system is described by Umeda and Onoue in Shingaku Technical Report, RCS91-30, under the title of "Idle-signal Casing Multiple Access with Partial Echo for Mobile Packet Communications". In the ICMA-PE system, a partial echo signal comprising a part of an upward packet signal is used as a collision control signal, taking into account a so-called survival by a complementary effect upon collision of packet signals. The ICMA-PE system will later be described in detail with reference to the drawing.

In the meanwhile, data transmission generally requires a high quality as compared with speech transmission. In order to assure such a high quality, data communication using packet signals is carried out by executing a transmission control protocol which will hereinafter be described. When a receiving section normally receives a packet signal as data, the receiving section sends back response information indicative of normal reception. A transmitting section transmits another packet signal in accordance with the response information from the receiving section. If no response is returned and receipt is not confirmed, the same packet signal is retransmitted. Thus, the packet signals are transmitted confirming safe receipt at the receiving section.

It will be assumed as a particular case in the packet communication system that the above-mentioned receipt confirmation system is adopted, that the ICMA system is used as a collision control system, and that the packet transmission channels for transmitting the upward and the downward packet signals are shared by different terminals. In the packet communication system, transmission of the response information indicating reception of the downward packet signal is impossible in some instances in the manner which will later be discussed with reference to the drawing.

SUMMARY OF THE INVENTION

It is therefore an object of this invention to provide a packet communication system which is capable of rapidly carrying out receipt confirmation for transmission of downward packet signals.

Other objects of this invention will become clear as the description proceeds.

According to this invention, there is provided a packet communication system for carrying out packet communication between a base station and a plurality of terminals through a common communication medium. The terminals comprises a first and a second terminal. The common communication medium comprises a downward communication channel through which a downward packet signal is transmitted from the base station towards the first and the second terminals in a broadcasting mode, and an upward communication channel through which an upward packet signal is transmitted from each of the first and the second terminals towards the base station, each of the first and the second terminals producing a particular packet signal in response to reception of the downward packet signal. In the packet communication system, the base station produces, as an internal signal, a command signal commanding confirmation of whether or not the first terminal is received with the downward packet signal. The base station is responsive to the command signal to temporarily inhibit the second terminal from transmitting the upward packet signal through the upward communication channel, thereby enabling the particular packet signal be transmitted as the upward packet signal through the upward communication channel.

According to this invention, there is provided a base station included in a packet communication system which is for carrying out packet communication between the base station and a plurality of terminals through a common communication medium. The terminals comprises a first and a second terminal. The common communication medium comprises a downward communication channel through which a downward packet signal is transmitted from the base station towards the first and the second terminals in a broadcasting mode, and an upward communication channel through which an upward packet signal is transmitted from each of the first and the second terminals towards the base station, each of the first and the second terminals producing a particular packet signal in response to reception of the downward packet signal. The base station produces, as an internal signal, a command signal commanding confirmation of whether or not the first terminal is received with the downward packet signal. The base station is responsive to the command signal to temporarily inhibit the second terminal from transmitting the upward packet signal through the upward communication channel, thereby enabling the particular packet signal be transmitted as the upward packet signal through the upward communication channel.

DESCRIPTION OF THE PREFERRED EMBODIMENTS

Figure 1:
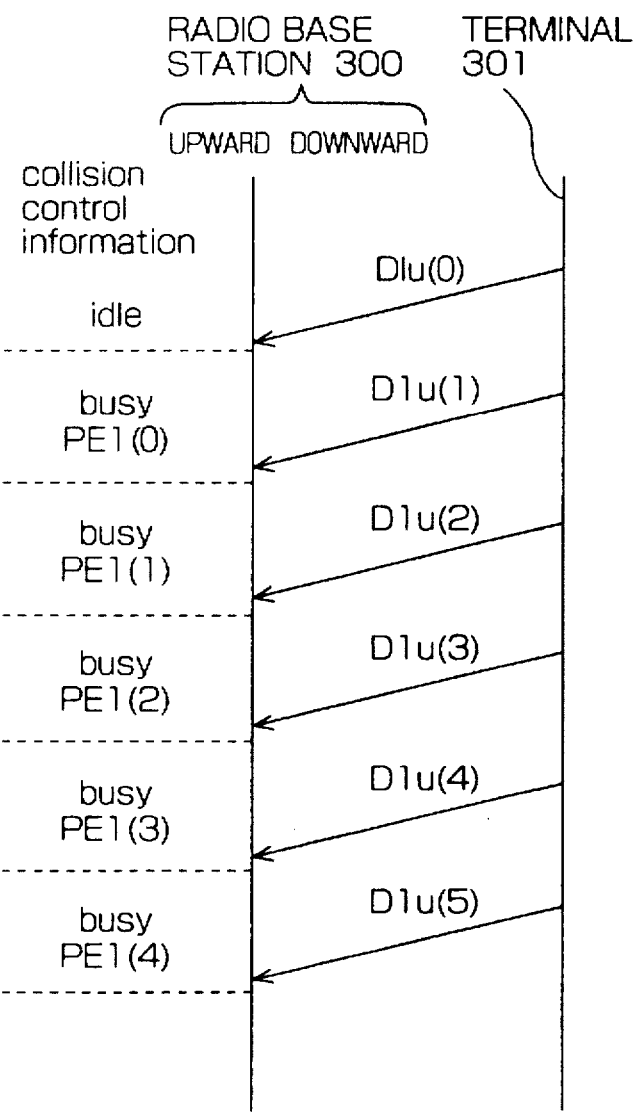
FIG. 1 is a flow chart for describing a conventional packet communication system using an ICMA-PE system.

Referring to FIG. 1, description will be made at first as regards a conventional packet communication system using an ICMA-PE system for a better understanding of this invention. When a radio base station 300 receives an upward packet signal D1u(0) from a terminal 301, the radio base station 300 sets a busy flag as collision control information and transmits the busy flag together with a downward packet signal through a downward communication channel which is not shown in the figure. In addition, the radio base station produces a partial echo signal PE1(0) comprising a part of the upward packet signal D1u(0) as received, particularly, such a part that enables recognition that the upward packet signal was sent from the terminal 301. The radio base station transmits the partial echo signal together with the downward packet signal. Thus, it is possible to relieve a survived packet signal which has survived the collision between the packet signals by the capture effect.

Figure 2:
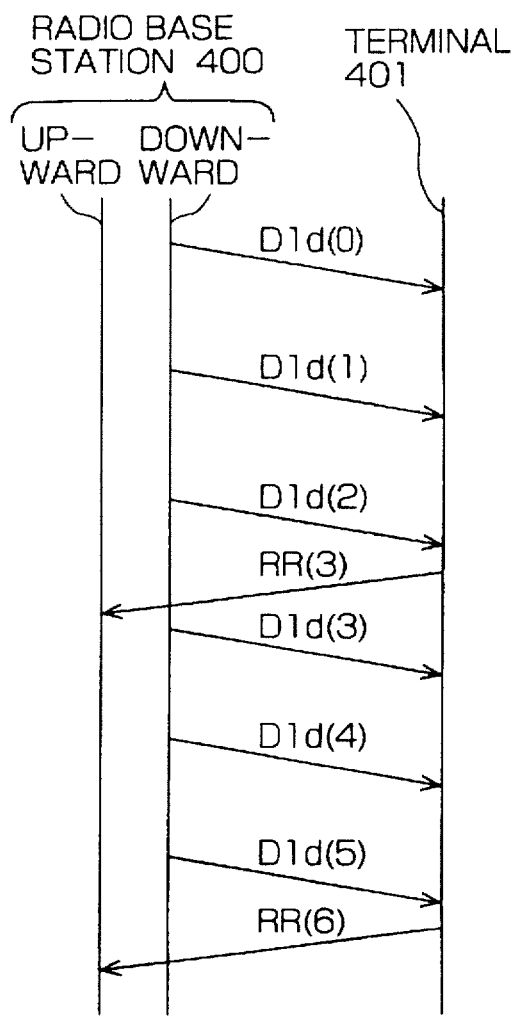
FIG. 2 is a flow chart for describing a case where upward and downward packet signals are transmitted through different packet communication channels in the conventional packet communication system.

Turning to FIG. 2, the description will be directed to a case where upward and downward packet signals are transmitted through different packet communication channels. A downward packet signal of a sequence number 1 is represented by D1d(i). Receive-ready response information RR(j) indicates that the downward packet signals up to the sequence number j-1 are normally received and that reception of the downward packet signal D1d(j) of the sequence number j is expected. A radio base station 400 in the transmitting section can transmit the downward packet signals up to a predetermined number k (which will be called hereafter a maximum outstanding number) even if receipt is not confirmed. In FIG. 2, the maximum outstanding number k is equal to 3. After the radio base station 400 transmits the downward packet signals D1d(0), D1d(1), and D1d(2) to a terminal 401, the terminal 401 sends the response information RR(3) indicating that the terminal 401 has received the downward packet signals up to the one labelled D1d(2). Similarly, the response information RR(6) transmitted from the terminal 401 indicates that the terminal 401 has received the downward packet signals up to the one labelled D1d(5).

Figure 3:
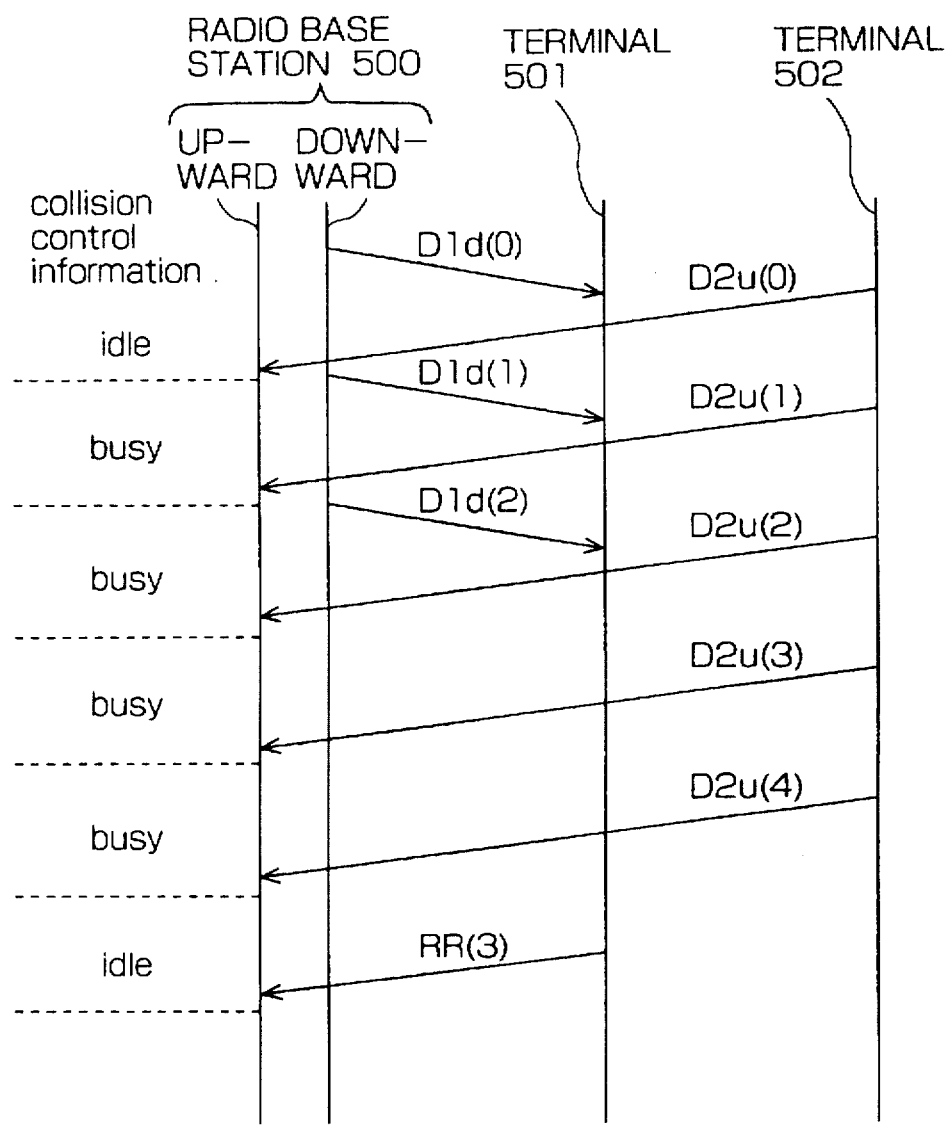
FIG. 3 is a flow chart for describing a particular case in the conventional packet communication system.

Turning to FIG. 3, the description will be directed to the particular case that is described in the preamble part. In the particular case, the maximum outstanding number k is equal to 3 for a terminal 501 receiving the downward packet signals. On the other hand, a terminal 502 transmitting the upward packet signals has five packet signals to be transmitted. In this event, the terminal 501 must transmit the response information RR(3) after reception of the downward packet signals D1d(0), D1d(1), and D1d(2). However, the terminal 502 is transmitting the upward packet signals, namely, uses the packet transmission channel. A radio base station 500 sets a busy flag as the collision control information and transmits the busy flag to the terminal 501 together with the downward packet signals. Accordingly, the terminal 501 can not transmit the response information. As a consequence, the radio base station 500 can not transmit to the terminal 501 the downward packet signals D1d(3) and subsequent downward packet signals.

Figure 4:
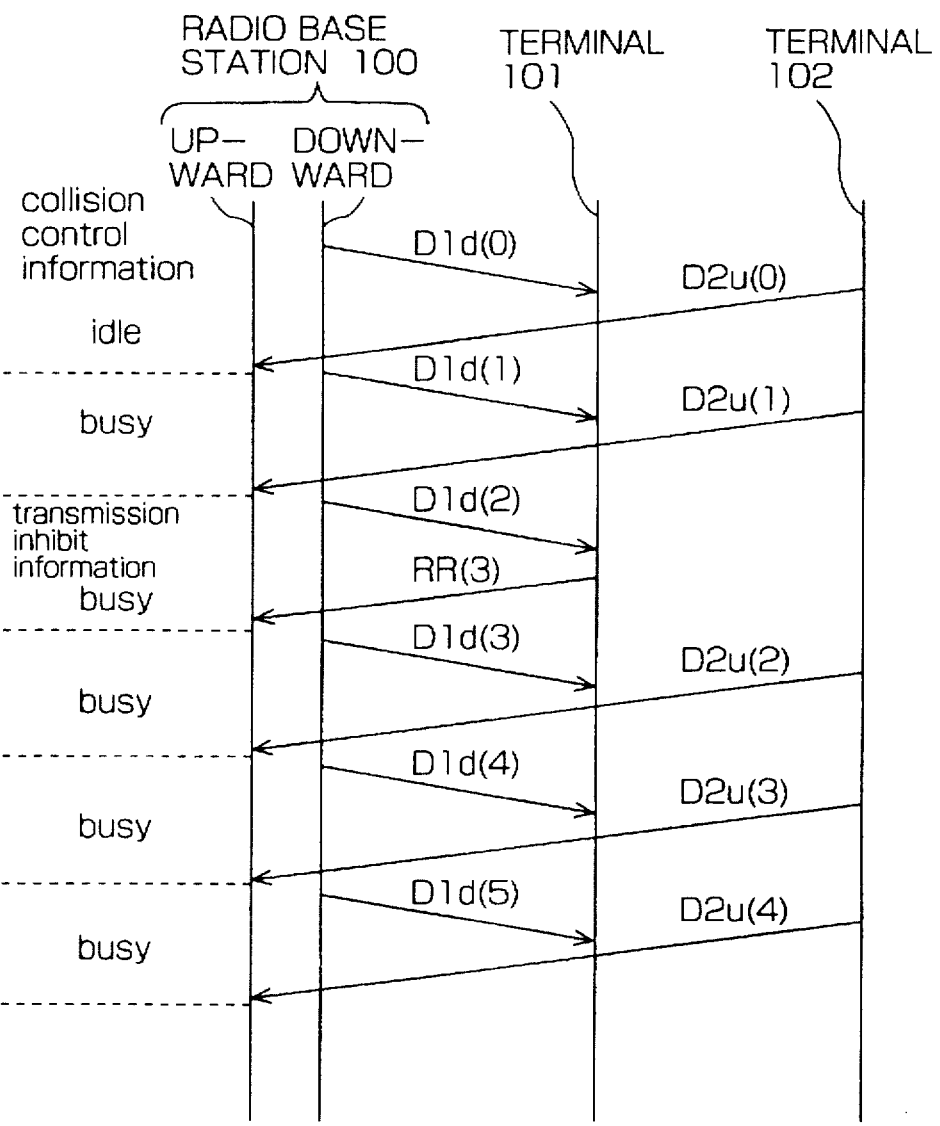
FIG. 4 is a flow chart for describing a packet communication system according to a first embodiment of this invention.

Referring to FIG. 4, the description will be made as regards a packet communication system according to a first embodiment of this invention. Although the radio communication mode will be described, the packet communication system may be in a wire communication mode.

The packet communication system of Embodiment 1 is a system in which packet communication is carried out between a radio base station 100 and a plurality of terminals (101 and 102 alone being illustrated) through a single common communication medium. The single communication medium comprises a downward communication channel through which a downward packet signal is transmitted from the radio base station 100 towards the terminals 101 and 102 in a broadcasting mode known in the art, and an upward communication channel through which an upward packet signal is transmitted from the terminals 101 and 102 towards the radio base station 100. This system is a FDD radio packet communication system in which the upward and the downward communication channels have different frequencies. As regards a multiple access in transmission of the upward packet signal, use is made of the ICMA system. In the packet communication system, each of the terminals 101 and 102 produces a particular packet signal in response to reception of the downward packet signal. The terminal 101 will be called hereafter the first terminal. The terminal 102 will be called hereafter the second terminal.

It is assumed that the radio base station 100 wishes to acquire response information indicating that the first terminal 101 has received the downward packet signal. In this event, the radio base station 100 produces a command signal commanding confirmation of whether or not the first terminal 101 has received the downward packet signal. In response to the command signal, the radio base station 100 temporarily inhibits the second terminal 102 from transmitting the upward packet signal so as to enable the first terminal 101 to transmit, as an upward packet signal, the particular packet signal, namely, a packet signal including the response information. More specifically, the radio base station 100 transmits, immediately before attempting acquisition of the response information, the downward packet signal with transmission inhibit information contained therein to indicate that the second terminal 102 should temporarily stop transmission of the upward packet signal. The second terminal 102 stops transmission of the upward packet signal when the downward packet signal containing the transmission inhibit signal is received.

Figure 5:
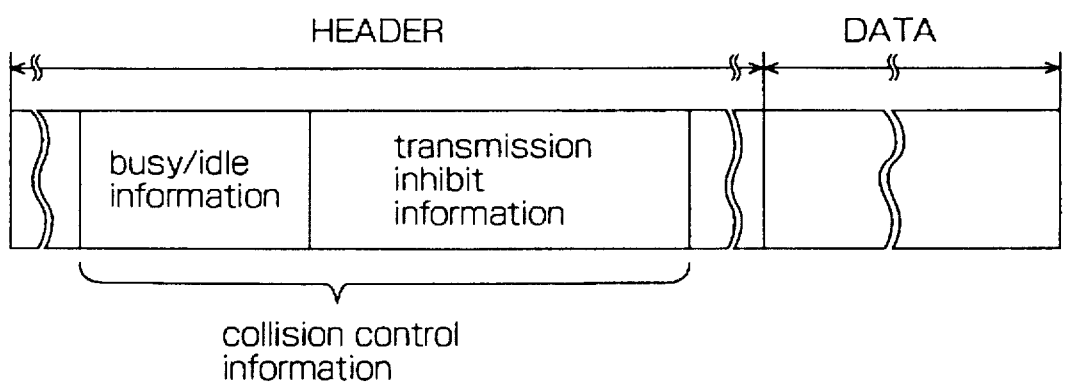
FIG. 5 is a signal format for use in describing an example of a downward packet signal used in the packet communication system illustrated in FIG. 4.

Referring to FIG. 5, collision information in a header comprises busy/idle information similar to the conventional one and the above-mentioned transmission inhibit information.

Now, the description will proceed to an operation of the packet communication system. While the downward packet signals D1d(0) and D1d(1) are transmitted from the radio base station 100 to the first terminal 101, the upward packet signals D2u(0) and D2u(1) are transmitted from the second terminal 102 to the radio base station 100 through the upward communication channel and received by the radio base station 100. When received with the upward packet signal D2u(0), the radio base station 100 sets a busy flag for collision control and transmits the downward packet signal D1d(1) containing the busy flag. In order to acquire the particular packet signal from the first terminal 101, the radio base station 100 sets the transmission inhibit information and then transmits the downward packet signal D1d(2) containing the transmission inhibit information.

When the downward packet signal D1d(2) is received through the downward communication channel, the first terminal 101 immediately transmits the response confirmation signal RR(3) and is ready for reception of the downward packet signal D1d(3) and subsequent downward packet signals.

As regards the terminal 102 on the other hand, the upward packet signal is transmitted therefrom so that the busy/idle information indicates busy. However, since the transmission inhibit information is set, transmission of the upward packet signal D2u(2) to the upward communication channel is temporarily inhibited.

By carrying out the above-mentioned control, the response information RR(3) from the first terminal 101 to the radio base station 100 is prevented from being delayed due to transmission of the upward packet signal from the second terminal 102 to the radio base station 100. Upon reception of the response information from the first terminal 101, the radio base station 100 unsets the transmission inhibit information and sets the busy information alone for collision control. Then, the radio base station transmits the downward packet signal D1d(3) to the first terminal 101 and waits the upward packet signal from the second terminal 102. The second terminal 102 confirms that the radio base station 100 unsets the transmission inhibit information, and transmits the upward packet signal D2u(2) and subsequent packet signals which have been inhibited from being transmitted.

Figure 6:
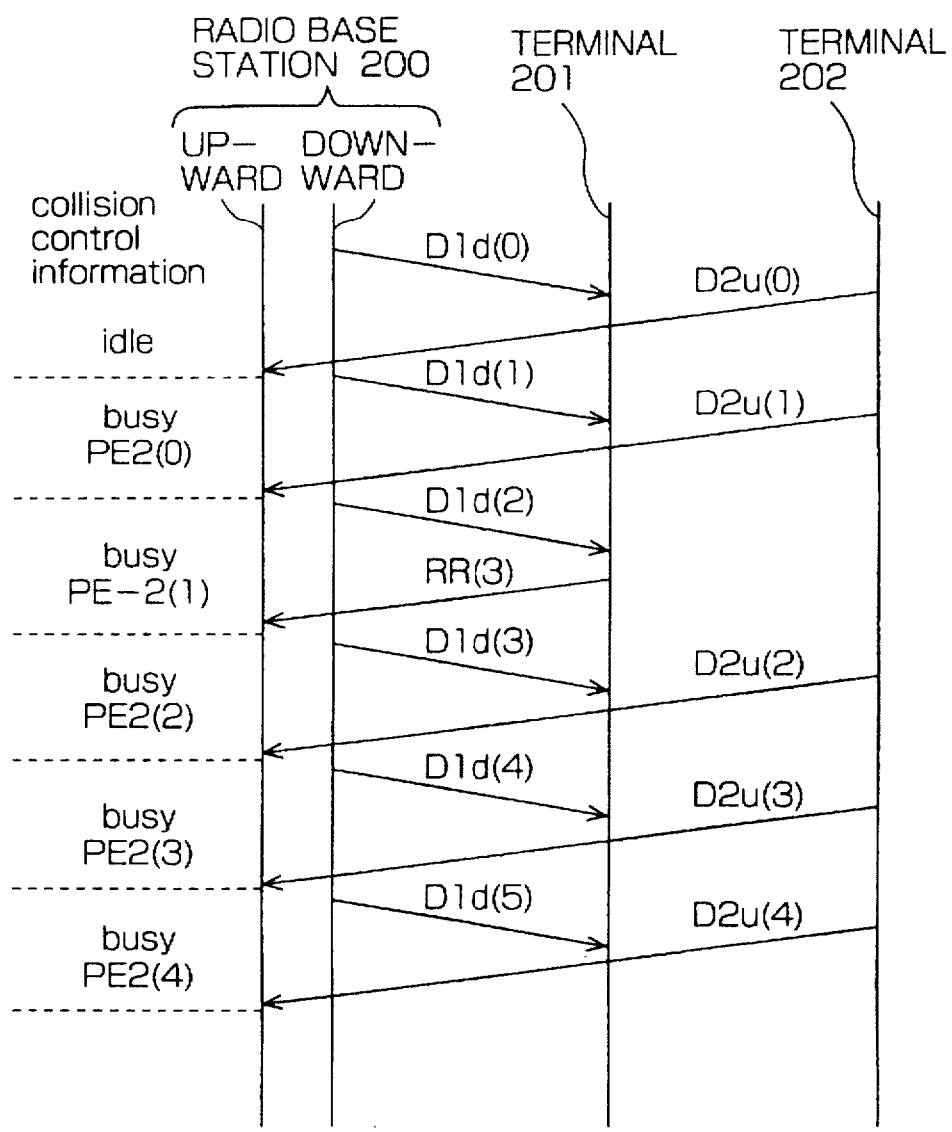
FIG. 6 is a flow chart for describing a packet communication system according to a second embodiment of this invention.

Referring to FIG. 6, the description will be made as regards a packet communication system according to a second embodiment of this invention. The packet communication system is a system in which packet communication is carried out between a radio base station 200 and a plurality of terminals (201 and 202 alone being illustrated) through a single common communication medium. The single common communication medium comprises a downward communication channel through which a downward packet signal is transmitted from the radio base station 200 towards the terminals 201 and 202 in the broadcasting mode, and an upward communication channel through which an upward packet signal is transmitted from the terminals 201 and 202 towards the radio base station 200. This system is a TDD radio packet communication system in which the upward and the downward communication channels have the same frequency. As regards a multiple access in transmission of the upward packet signal, use is made of the ICMA-PE system. In the packet communication system, each of the terminals 201 and 202 produces a particular packet signal in response to reception of the downward packet signal. The terminal 201 will be called hereafter the first terminal. The terminal 202 will be called hereafter the second terminal.

In the packet communication system, the radio base station 200 produces a partial echo signal dependent on the upward packet signal to normally transmit, as the downward packet signal, the partial echo signal to the second terminal 202. The partial echo signal comprises at least a part of the upward packet signal as received. The part has such a nature that enables identification of the second terminal 202 which has transmitted the upward packet signal. In this event, the partial echo signal has a partial signal value represented by a bit string known in the art.

It is assumed that the radio base station 200 wishes to acquire response information indicating that the first terminal 201 has received the downward packet signal. In this event, the radio base station 200 produces, as an internal signal, a command signal commanding confirmation of whether or not the first terminal 201 has received the downward packet signal. In response to the command signal, the radio base station 200 produces a pseudo echo signal to particularly transmit, as the downward packet signal, the pseudo echo signal instead of the partial echo signal to the second terminal 202. In other words, when the base station 200 wishes to acquire the response information, the base station transmits the downward packet signal with the pseudo echo signal contained therein instead of the partial echo signal immediately before attempting acquisition of the response information.

The pseudo echo signal is different from the partial echo signal. The second terminal 202 continues transmission of the upward packet signal upon reception of the downward packet signal containing the partial echo signal. On the other hand, the second terminal 202 stops transmission of the upward packet signal upon reception of the downward packet signal containing the pseudo echo signal. More particularly, the radio base station 200 is responsive to the command signal to temporarily inhibit the second terminal 202 from transmitting the upward packet signal so as to enable the first terminal 201 to transmit, as the upward packet signal, the particular packet signal, namely, a packet signal including the response information. In this event, the pseudo echo signal has a pseudo signal value which is equal to one's complement for the partial signal value. This means that the pseudo echo signal corresponds to the partial echo signal.

Now, description will proceed to an operation of the packet communication system. While the downward packet signals D1d(0) and D1d(1) are transmitted from the radio base station 200 to the first terminal 201, the upward packet signals D2u(0) and D2u(1) are transmitted from the second terminal 202 to the radio base station 200 through the upward communication channel and received by the radio base station 200. After the upward packet signal D2u(0) is received, the radio base station 100 sets a busy flag for collision control and also sets the partial echo signal PE2(0) which is a part of the upward packet signal D2u(0) as transmitted. The busy flag and the upward packet signal are made to be included in the downward packet signal D1d(1) and transmitted together. After the radio base station 200 transmits the downward packet signal D1d(2), it is desired to acquire a response confirmation signal from the terminal 201. To this end, the radio base station 200 prepares and sets, instead of the partial echo signal PE2(1), the pseudo echo signal PE-2(1) which is one's complement for the partial echo signal. The radio base station 200 transmits the downward packet signal D1d(2) with the pseudo echo signal and the busy signal contained therein.

Upon reception of the downward packet signal D1d(2) through the downward communication channel, the terminal 201 immediately transmits the response confirmation signal RR(3) and is ready for reception of the downward packet signal D1d(3) and subsequent packet signals.

As regards the terminal 202 on the other hand, the upward packet signal is transmitted therefrom so that the busy/idle information indicates busy. However, since the downward packet signal D1d(2) contains the pseudo echo signal PE-2(1) different from the partial echo signal PE2(1), transmission of the upward packet signal D2u(2) to the upward communication channel is temporarily inhibited.

By carrying out the above-mentioned control, the response information from the first terminal 201 to the radio base station 200 is prevented from being delayed due to transmission of the upward packet signal from the second terminal 202 to the radio base station 200.

Upon reception of the response information RR(3) from the first terminal 201, the radio base station 200 returns the pseudo echo signal PE-2(1) to the partial echo signal PE2(1) (not shown) and sets the busy information. The radio base station 200 transmits to the first terminal 201 the downward packet signal D1d(3) with the partial echo signal and the busy information contained therein and waits the upward packet signal from the second terminal 202. The second terminal 202 transmits the upward packet signal D2u(2) and subsequent signals which have been inhibited from being transmitted because the downward packet signal from the radio base station 200 contains the partial echo signal relating to the terminal in consideration.

While the present invention has far been described in connection with a few embodiments thereof, it will readily be possible for those skilled in the art to put this invention into practice in various other manners. Although use is made of one's complement of the partial echo signal as the pseudo echo signal, the pseudo echo signal may be any signal which is different from the partial echo signal but reflects the condition of the partial echo signal. In practice, the pseudo echo signal preferably has values in one-to-one correspondence to the partial echo signal. Although the packet communication system of FIG. 6 is described in connection with the TDD communication system, the similar effect is obtained in the FDD communication system described in the packet communication system of FIG. 4.

What is claimed is:

1. A packet communication system for carrying out packet communication between a base station and a plurality of terminals through a common communication medium, said terminals comprising a first and a second terminal, said common communication medium comprising:

a downward communication channel through which a downward packet signal is transmitted from said base station towards said first and said second terminals in a broadcasting mode; and an upward communication channel through which an upward packet signal is transmitted from each of said first and said second terminals towards said base station, each of said first and said second terminals producing a particular packet signal in response to reception of said downward packet signal;

said base station producing, as an internal signal, a command signal commanding confirmation of whether or not said first terminal has received said downward packet signal, said base station being responsive to said command signal to temporarily inhibit said second terminal from transmitting said upward packet signal through said upward communication channel, thereby enabling said particular packet signal to be transmitted as said upward packet signal through said upward communication channel.

2. A packet communication system as claimed in claim 1, wherein said base station produces a specific packet signal in response to said command signal to transmit said specific packet signal as said downward packet signal through said downward communication channel to said second terminal, said second terminal stopping transmission of said upward packet signal in response to said specific packet signal.

3. A packet communication system as claimed in claim 1, wherein said base station produces a partial echo signal in response to said upward packet signal to normally transmit, as said downward packet signal, said partial echo signal to said terminals, wherein said base station also produces a pseudo echo signal in response to said command signal to particularly transmit, as said downward packet signal, said pseudo echo signal instead of said partial echo signal to said terminals, said second terminal continuing transmission of said upward packet signal upon reception of said partial echo signal, said second terminal stopping transmission of said upward packet signal upon reception of said pseudo echo signal.

4. A packet communication system as claimed in claim 3, wherein said partial echo signal has a partial signal value, said pseudo echo signal having a pseudo signal value which is equal to one's complement for said partial signal value.

5. A base station included in a packet communication system which is for carrying out packet communication between said base station and a plurality of terminals through a common communication medium, said terminals comprising a first and a second terminal, said common communication medium comprising a downward communication channel through which a downward packet signal is transmitted from said base station towards said first and said second terminals in a broadcasting mode, and an upward communication channel through which an upward packet signal is transmitted from each of said first and said second terminals towards said base station, each of said first and said second terminals producing a particular packet signal in response to reception of said downward packet signal;

said base station producing, as an internal signal, a command signal commanding confirmation of whether or not said first terminal has received said downward packet signal, said base station being responsive to said command signal to temporarily inhibit said second terminal from transmitting said upward packet signal through said upward communication channel, thereby enabling said particular packet signal to be transmitted as said upward packet signal through said upward communication channel.

6. A base station as claimed in claim 5, said second terminal stopping transmission of said upward packet signal in response to a specific packet signal, wherein said base station produces said specific packet signal in response to said command signal to transmit said specific packet signal as said downward packet signal through said downward communication channel to said second terminal.

7. A base station as claimed in claim 5, said second terminal continuing transmission of said upward packet signal upon reception of a partial echo signal, said second terminal stopping transmission of said upward packet signal upon reception of a pseudo echo signal, wherein said base station produces said partial echo signal in response to said upward packet signal to normally transmit, as said downward packet signal, said partial echo signal to said terminals, said base station producing said pseudo echo signal in response to said command signal to particularly transmit, as said downward packet signal, said pseudo echo signal instead of said partial echo signal to said terminals.

8. A base station as claimed in claim 7, wherein said partial echo signal has a partial signal value, said pseudo echo signal having a pseudo signal value which is equal to one's complement for said partial signal value.

9. The system of claim 1, wherein said command signal produced by said base station takes into consideration a maximum number k of said downward packet signals to be acknowledged in one said particular packet signal by said first terminal, k being greater than one.

10. The base station of claim 5, wherein said command signal produced by said base station takes into consideration a maximum number k of said downward packet signals to be acknowledged in one said particular packet signal by said first terminal, k being greater than one.

* * * * *